Figure 12:
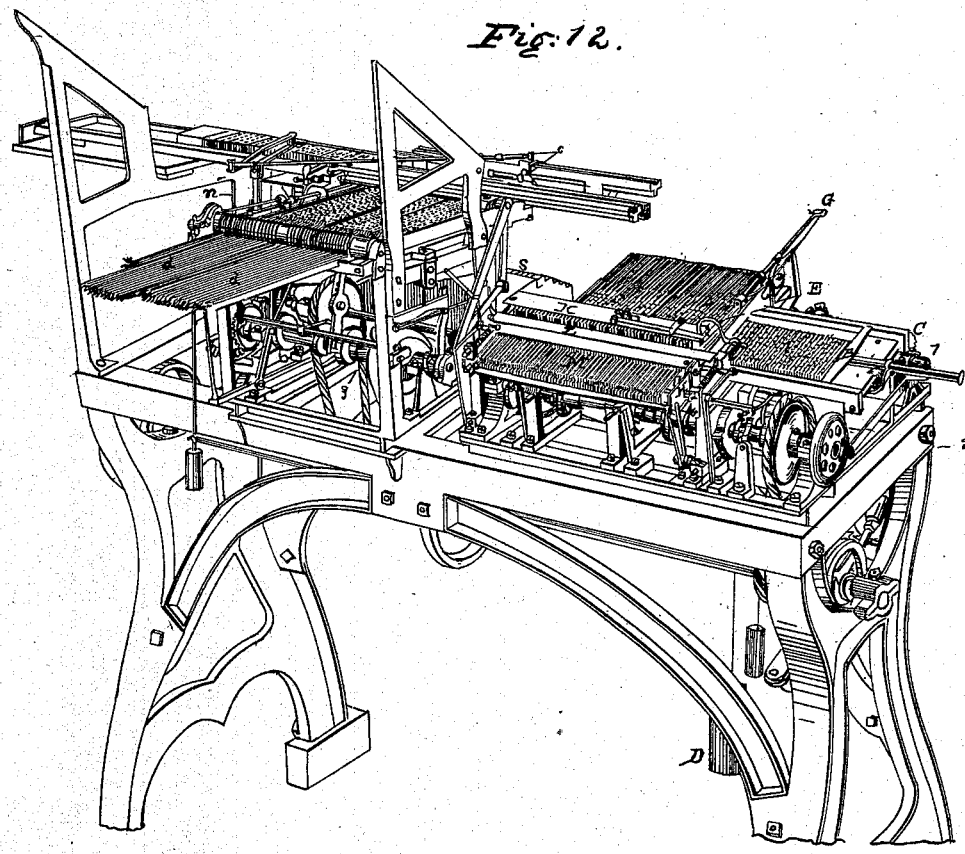

W. H. HOUSTON.
Setting and Distributing Type.
No. 75,681.
9 Sheets—Sheet 1.
Patented March 17, 1868.
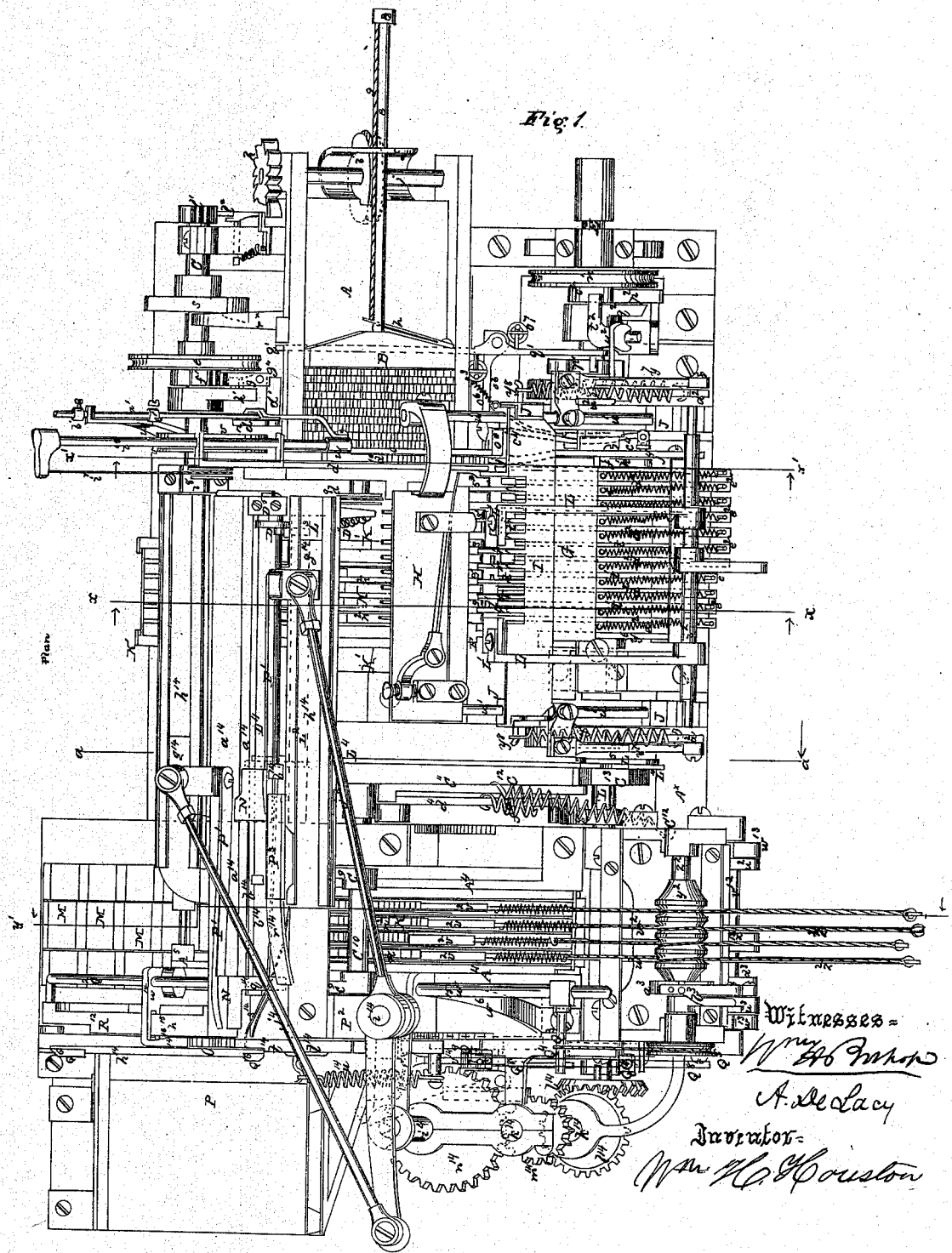

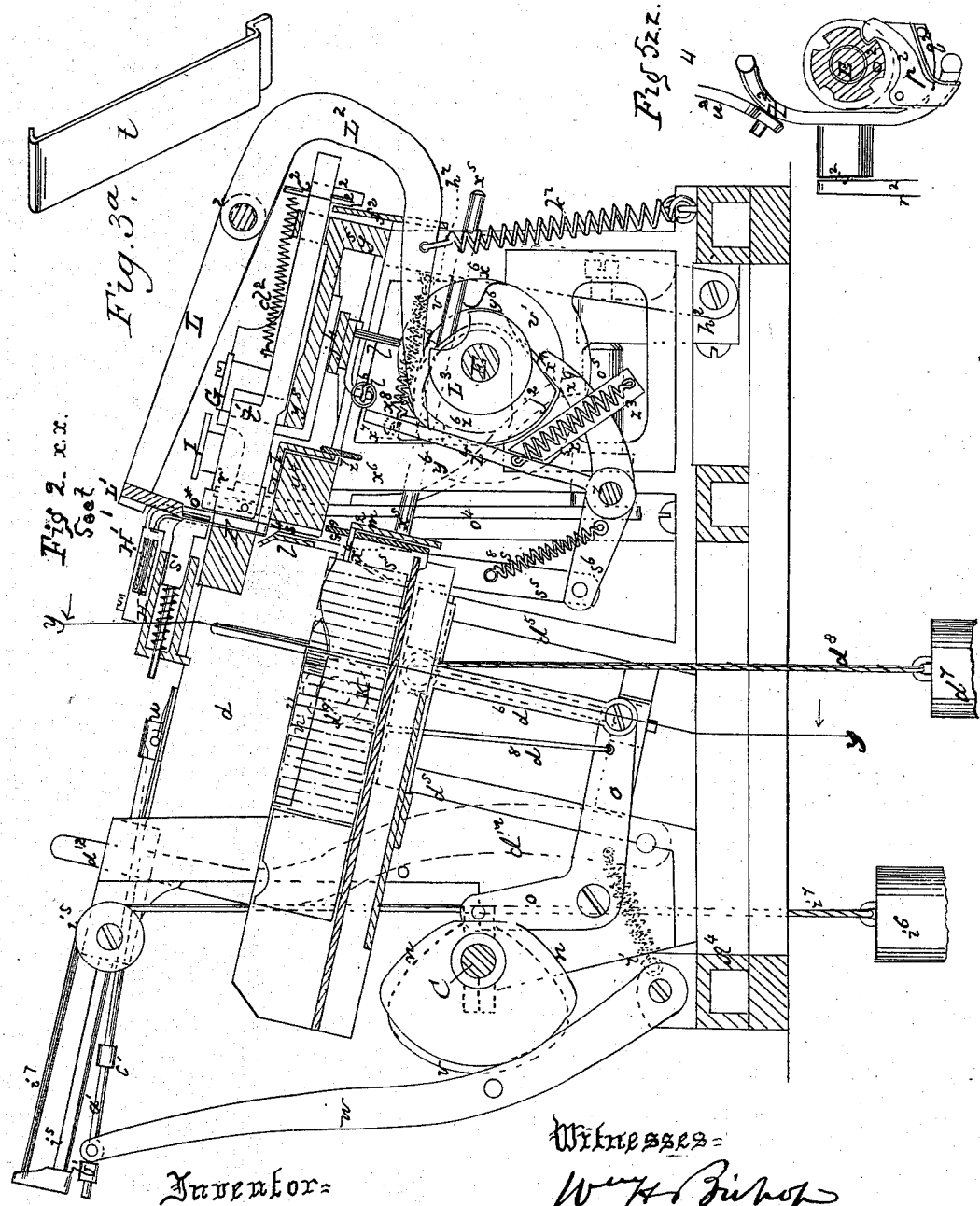

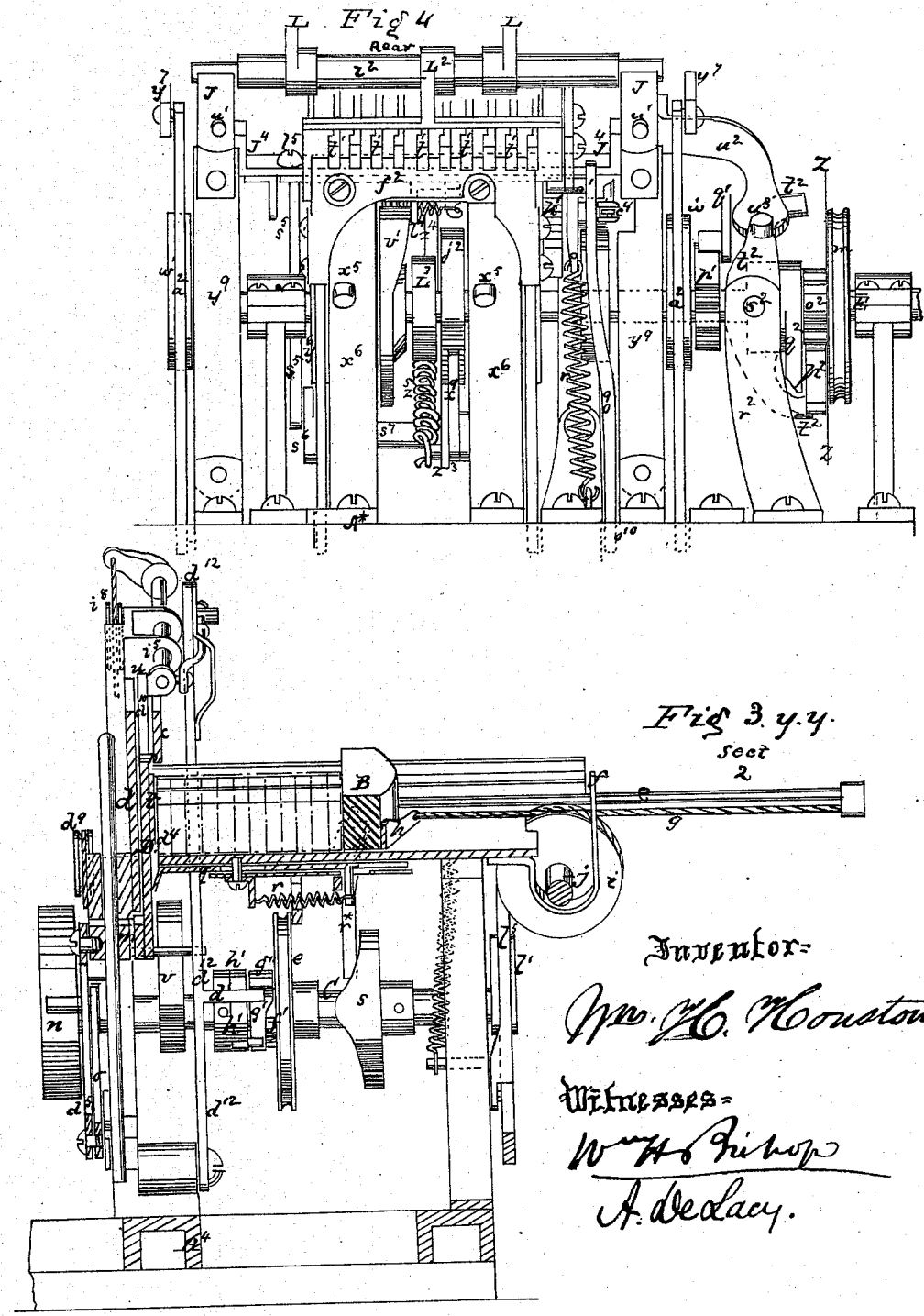

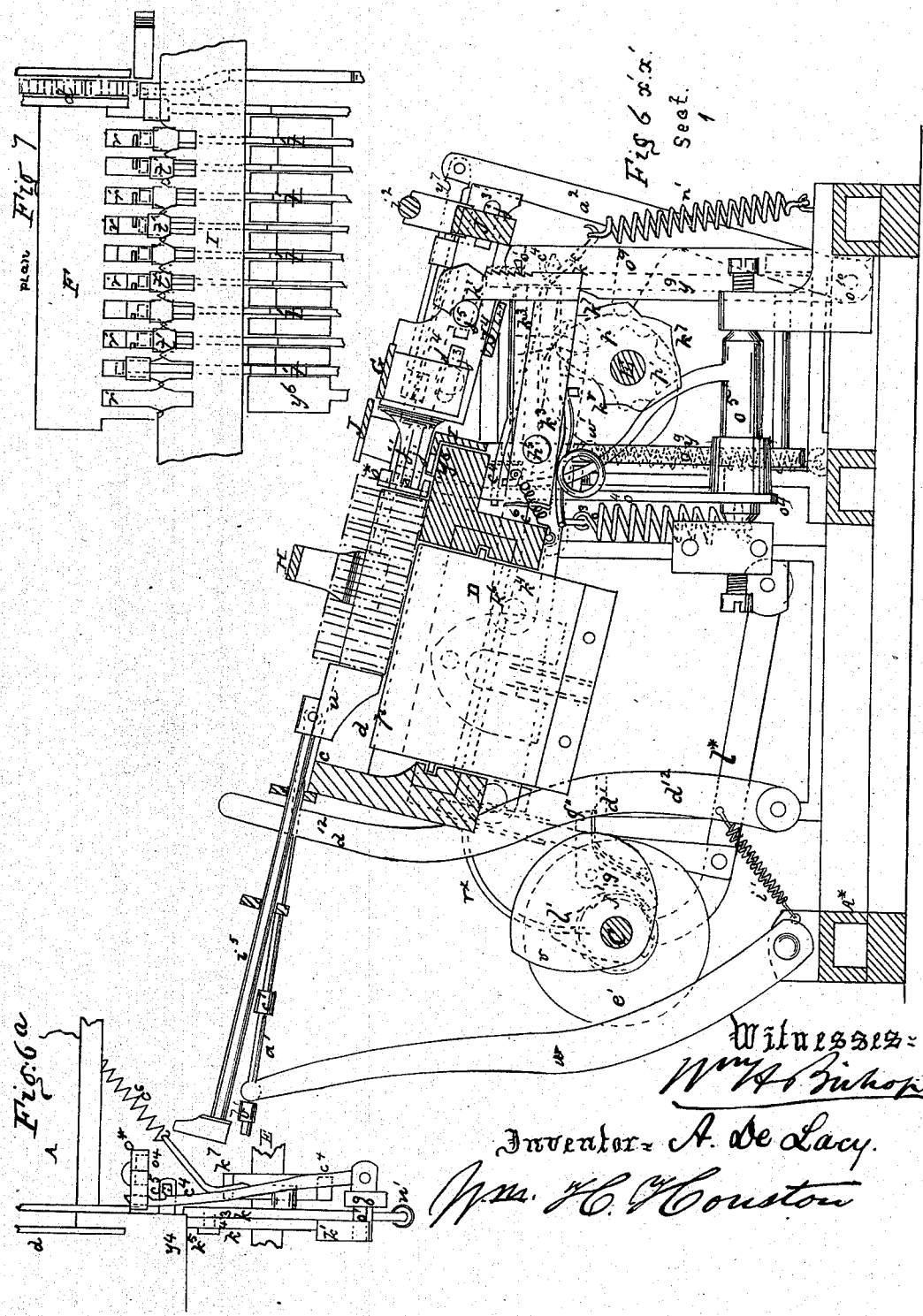

W. H. HOUSTON.
Setting and Distributing Type.
No. 75,681.
9 Sheets—Sheet 5.
Patented March 17, 1868.
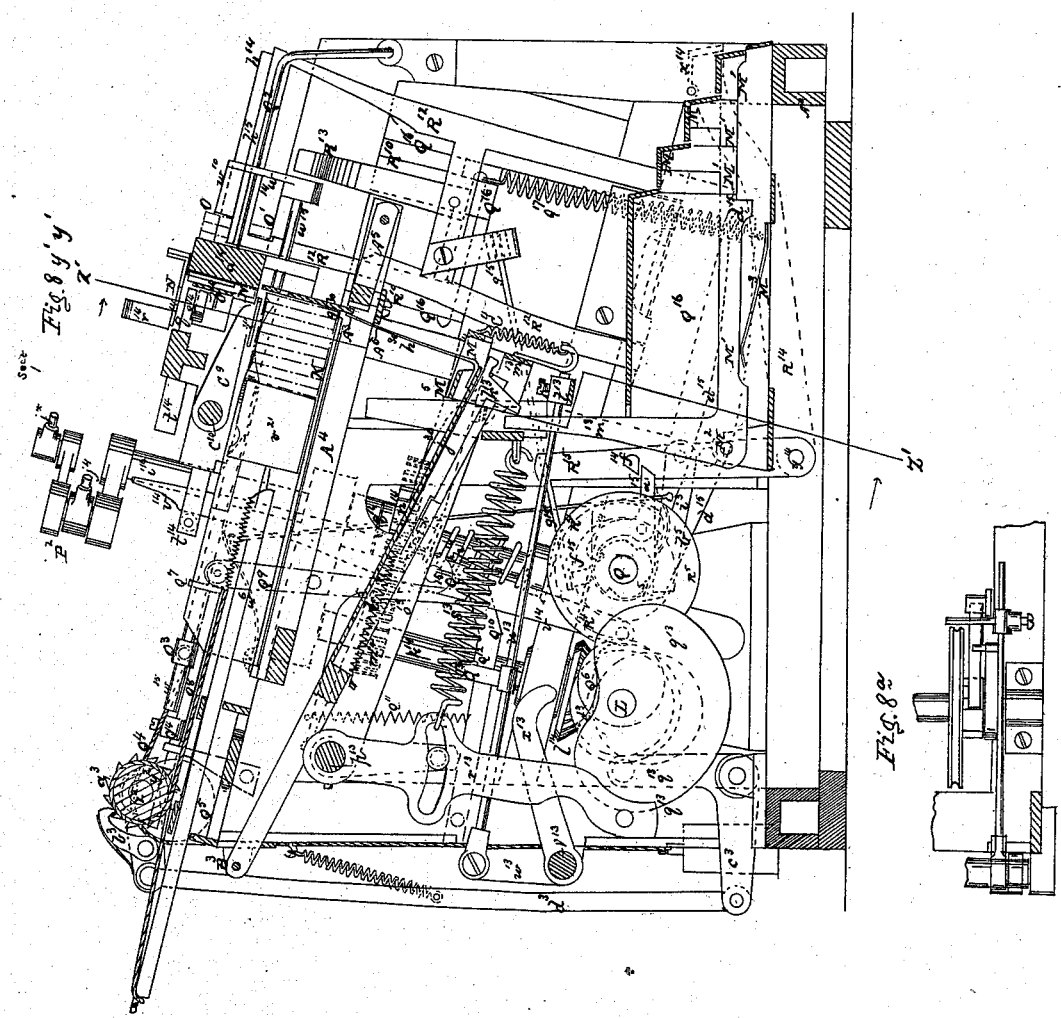

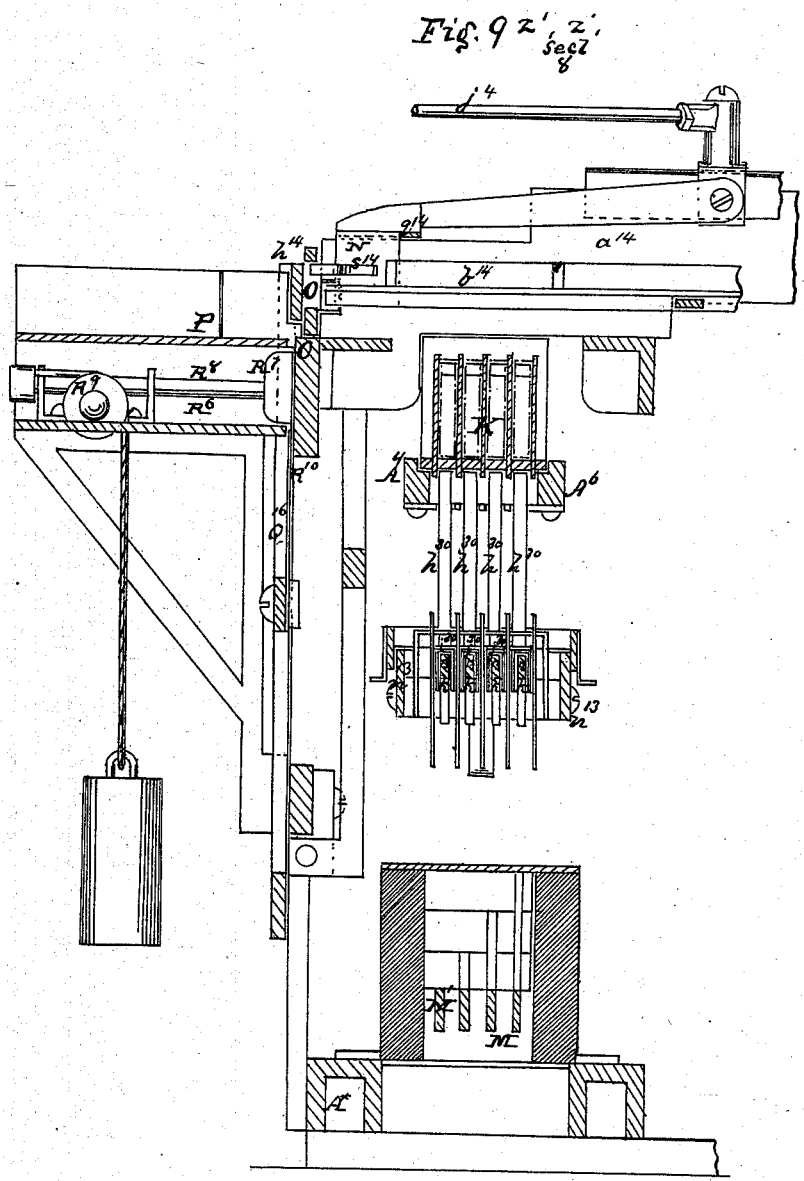

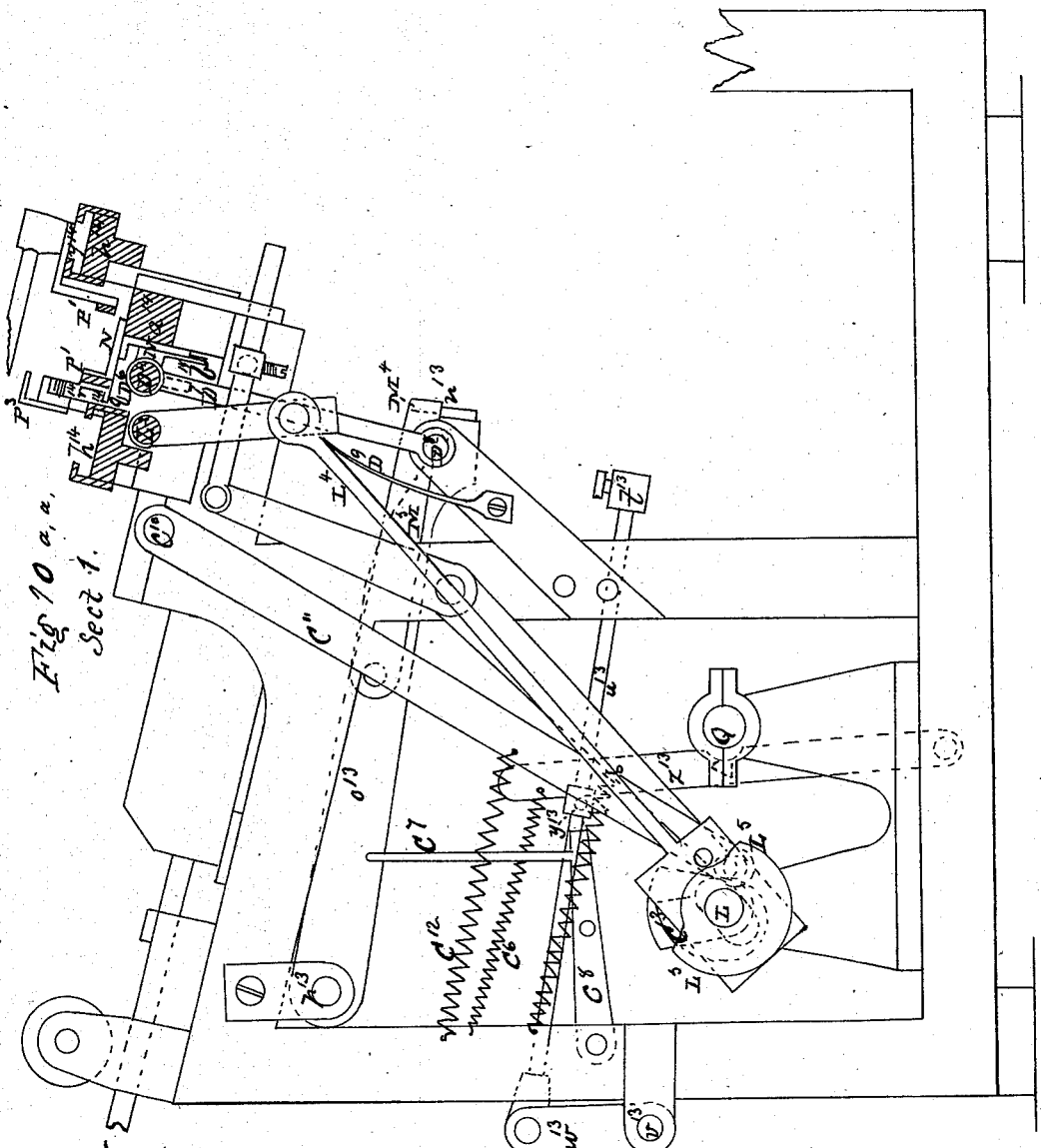

W. H. HOUSTON.
Setting and Distributing Type.
No. 75,681.
9 Sheets—Sheet 8.
Patented March 17, 1868.
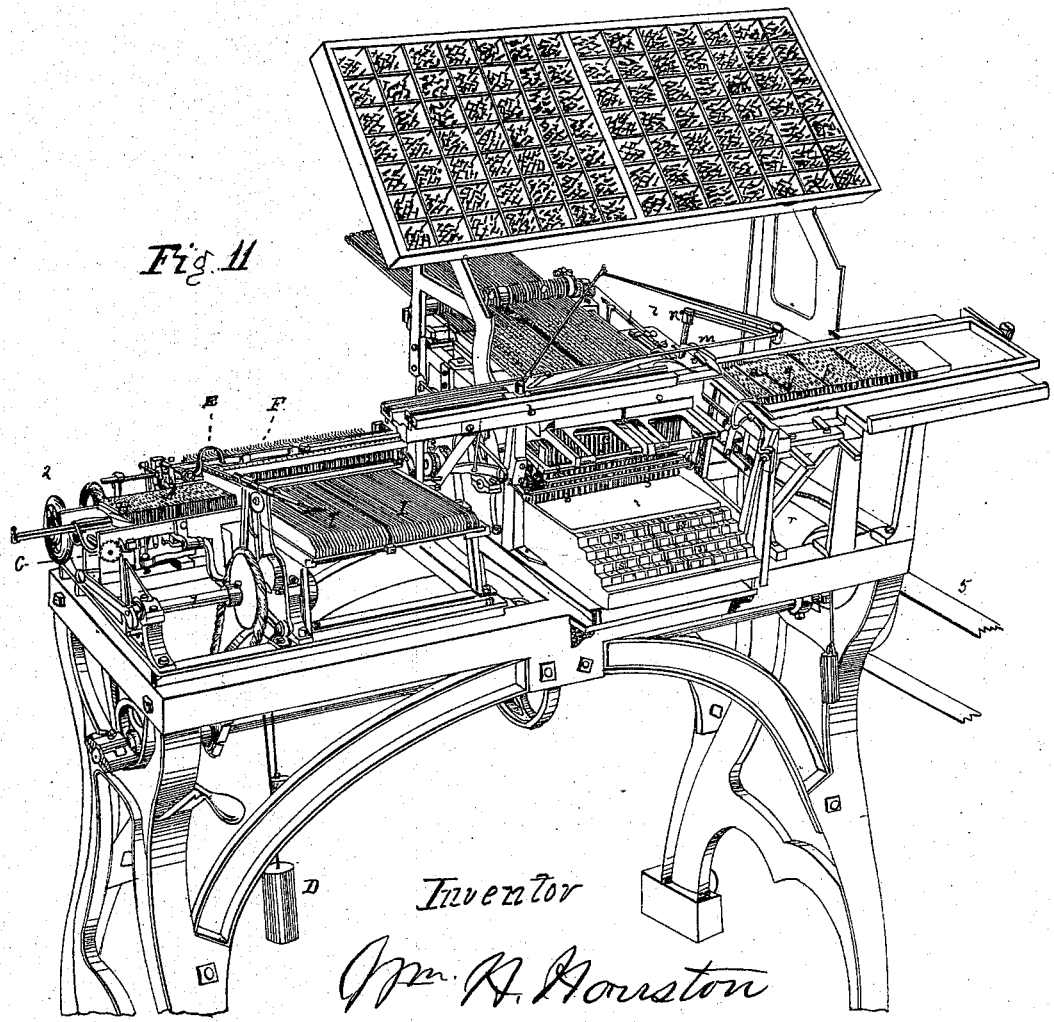

W. H. HOUSTON.

Setting and Distributing Type.

No. 75,681.

9 Sheets—Sheet 9.

Patented March 17, 1868.

Inventor
Wm. H. Houston

Witnesses
Wm. H. Bishop
A. De Lacy

UNITED STATES PATENT OFFICE.

WILLIAM H. HOUSTON, OF NEW YORK, N. Y.

IMPROVEMENT IN MACHINES FOR SETTING AND DISTRIBUTING TYPE.

Specification forming part of Letters Patent No. 75,681, dated March 17, 1868.

*To all whom it may concern:*

Be it known that I, WILLIAM H. HOUSTON, of the city, county, and State of New York, have invented certain new and useful Improvements in the Machine for Setting and Distributing Types; and I do hereby declare that the following is a full, clear, and exact description of the same, reference being had to the accompanying drawings, making part of this specification, in which—

Figure 1 represents a plan of the machine. Fig. 2 is a transverse vertical section of the distributing mechanism, taken in the plane of the line $x\ x$ of Fig. 1, and looking in the direction of the arrow. Fig. 3 is a partial longitudinal section of the same at the line $y\ y$ of Fig. 2, and looking in the direction of the arrow. Fig. 4 is a rear view of the same. Fig. 5 is a sectional view of the stop-motion, the plane of section being indicated by the line $z\ z$ of Fig. 4. Fig. 6 is a transverse vertical section of the distributing mechanism, taken at the line $x'\ x'$ of Fig. 1. Fig. 7 is a plan of the forwarding and trial rack detached. Fig. 8 is a transverse vertical section of the mechanism for composing or setting type, taken at the line $y'\ y'$ of Fig. 1, and looking in the direction of the arrow. Fig. 9 is a partial longitudinal section of the same, taken at the line $z'\ z'$ of Fig. 8, and looking in the direction of the arrow; Fig. 10, a transverse vertical section at the line $a\ a$ of Fig. 1, looking in the direction of the arrow. Fig. 11 is a perspective view of the entire machine taken from the front; Fig. 12, a perspective view of the machine taken from the rear.

The detail figures will be referred to hereafter.

The same letters indicate like parts in all the figures except Figs. 11 and 12.

My present invention relates to improvements in the machine for composing and distributing types described in and secured by Letters Patent of the United States granted to me, and bearing date the 31st day of March, 1857.

In my said original and patented invention, as in the present, the two operations of composing or setting types and of distributing the types are separate and distinct, but necessary the one to the other, and the operation of distributing really precedes the composing operation, because by the distributing operation the several letters and characters are arranged in separate channels in a type-case, there being one such channel for each letter of the alphabet, character, quadrat, space, &c., and after the distribution has been effected in the said channels the case is transferred from the distributing to the composing part of the machine. The type-case, for convenience of handling, may be made in two or more parts which will readily fit, so that they can be properly placed and adjusted.

In my said original machine the column of types to be distributed was placed on a galley, and each line in succession pushed out laterally, and on the same plane, to be distributed. This was found to be inconvenient, because in what is termed "solid matter"—that is, when thin strips of metal, termed "leads," are not interposed between the lines of types—the types of the line that was being pushed out were liable to catch against the edges of the types of the next adjacent line, and thus impede the operation of the machine. This difficulty I have avoided by one part of my present invention, which consists in combining, with the galley and mechanism for pushing out the line of types to be distributed, what I denominate a lifting mechanism, by which the line of types to be distributed is lifted up above the plane of the column, and by a motion in the direction of the length of the types, so that the line being lifted can be pushed laterally without danger of catching.

The mode of construction and application of this part of my invention is represented in Figs. 2, 3, and 6 of the accompanying drawings, in which A is the galley on which the column of types to be distributed is placed, and in which they are pressed forward toward the distributing end by a follower, B. This follower has a rod, $e$, which slides in a guide, $f$, and a cord, $g$, is attached above and to the rear end of the rod, passes around a grooved wheel, $i$, and the other end is attached to a spring, $h$, on the back of the follower; the office of the said spring being to keep the cord distended and permit the wheel to slip whenever its motion is greater than the motion required to be imparted to the column of types. The said wheel $i$ is on a shaft, $j$, provided at one end with a ratchet-wheel, $k$, which is operated by a pawl, $l$, connected to a lever, $l^*$, which is drawn up to lift the pawl by the tension of a spring, and forced down to push forward the column of types by a tappet, $l^1$, on a shaft, C, which makes one revolution for every line of type which is delivered to be distributed.

When the column of types is advanced, it is forced forward until the forward line strikes against a gage-plate, $d$, at the front end of the galley, by which the forward motion is stopped. Between the said gage-plate and the front end of the bed of the galley there is an open space, $d^4$, (see Fig. 3,) equal to the thickness of a line of types and a lead, and in this space the lifter D is located. It is a plate adapted to slide accurately, but freely, in ways $d^5$, (see Fig. 2,) so as to work in the said space. When let down to its lowest position, its upper edge is slightly below the plane of the upper surface of the bed of the galley to receive the forward line of types to be lifted.

The lifter is connected by a joint-link, $d^6$, with one arm of an elbow-lever, $o$, the other arm of which is acted upon by a cam, $n$, on the shaft C, which cam is so formed as to depress the lifter at the time required, and hold it down while the column of types is being advanced, and permit it to be drawn up to lift the foremost line of types by a weight, $d^7$, (see Fig. 2,) connected with the said elbow-lever by a cord, $d^8$, passing over a pulley, $d^9$. When lifted up, the types of the line are held in position by two parallel plates, of which the gage-plate is one, thus forming a channel-way, $d^{10}$, (see Figs. 1 and 3,) in which the line of types can slide as they are pushed along to be delivered one by one to the distributing mechanism. This operation is performed by a follower, $u$, fitted to slide in the said channel-way. It is attached to a rod, $i^5$, and is pushed forward by a weight, $i^6$, (see Fig. 2,) connected with the rear end of the said rod by a cord, $i^7$, passing over a pulley, $i^8$, so that the force is always acting to push the line of types toward the delivery end.

It is necessary to the operation of this part of the mechanism that all the motions hereinabove described should be suspended during the delivery of the types of each line, and again started when a line has been delivered. To accomplish this result the shaft C is driven by a pulley, $e^1$, which receives a band from a line-shaft not necessary to be represented, and this pulley runs loose on the said shaft, except when clutched to it. The hub $f^1$ (see Figs. 1 and 3) of this pulley is formed with ratchet-teeth, which are engaged by a spring-dog, $g^1$, hinged to an arm, $h^1$, on the shaft C, and this dog has a projecting arm, $g^{11}$, so that at the end of one revolution of the said shaft, which is sufficient to give the operations derived from it, the arm $g^{11}$ of the said dog strikes a stop, $d^1$, which disengages it from the ratchet-teeth of the hub of the pulley, thereby unclutching the shaft, which stops while the pulley continues to turn. This stop $d^1$ is on a lever, $d^{12}$, which is held back in the position to stop the dog by the tension of a spring, $i^1$. A rod, $a^1$, is attached by one end to the rod $i^5$ of the follower $u$, which pushes the line of types, and by the other end to a lever, $w$, which is acted upon by a cam, $v$, on the shaft C, for the purpose of drawing back the said follower, to permit another line of types to be lifted; and on this rod $a^1$ there is an adjustable stop, $c^1$, so set that as the last type of a line is being delivered strikes against the lever $d^{12}$ of the stop $d^1$, and draws the said stop away from the spring-dog $g^1$, which immediately springs into one of the ratchet-teeth and clutches the driving-pulley $c^1$ to the shaft C, which is thereby set in motion to impart the motions required—that is to say, to draw back the follower $u$, liberate the lever $d^{12}$, that it may be drawn back by its spring to put the stop $d^1$ in position to unclutch the shaft C at the end of one revolution, depress the lifter D, and operate the follower B to push forward the column of types, and then to liberate the lever $o$, which has depressed the lifter, that it may be operated by the weight $d^7$ to lift the next line of types; and the said shaft C during its revolution also performs another operation, to be described in connection with the next part of my present invention.

And my said invention also consists in forming a projecting lip on that face of the lifter which is toward the column of types, so that in distributing leaded matter the said lip shall catch on the upper edge of the lead and, in descending, preparatory to lifting the next line of type, draw down and discharge the lead.

And this part of my invention also consists in combining with such a lip on the lifter a slide under the galley and below the column of types, to hold up the lead until the lifter begins to descend, and which is moved out of the way to permit the discharge of the lead as the lifter begins to descend.

And this part of my said invention also consists in combining, with the said lip on the face of the lifter, a plate fitted to the face of the lifter, so that it can be put on under the lip, that the same lifter may be used for distributing either solid or leaded matter.

On the face of the lifter next to the galley there is a projecting lip, $p$, (see Fig. 3,) placed at such an elevation that when the lifter has lifted a line of types the said lip catches over the upper edge of the lead, when leaded matter is to be distributed, so that when the lifter descends, preparatory to lifting another line, the lead is drawn down and discharged. And there is a plate, $q$, (see Fig. 3,) termed the lead-liberating slide, adapted to slide in contact with the under side of the bed of the galley, the forward part of which is bended and extends slightly beyond that edge of the bed of the galley which is next to the lifter, to hold up and prevent the lead from falling until the lifter descends. The said plate is held in that position by the tension of a spring, $r$, and just as the lifter has descended the said plate is drawn back to permit the lead to be discharged, this operation being performed by a cam, $s$, on the shaft C which strikes the end of a lever, $r^*$, connected with the said lead-liberating slide, and the cam is of such form that it liberates the lever to permit the slide to be restored so soon as the lead drops out.

When, as before stated, the machine is to be used for distributing matter which is not leaded, a plate, $t$, represented separately in Fig. $3^a$, is secured to the face of the lifter just under the lip $p$. This plate is made of a thickness equal to the projection of the lip, and secured to the lifter by a hooked lip at one end and a spring-catch flange at the other.

The next part of my said invention relates to the mechanism which takes the types, one by one, from the line which has been elevated, and delivers them to the distributing mechanism, and as the types vary considerably in thickness this part of my said invention is so organized that by its mode of operation it is self-adapting to the varying thickness of the types.

Opposite to the line of types which has been elevated there is what may be termed a movable check, $j^1$, which has its line of motion toward and from and in the line of the channel-way in which the line of types is moved to be delivered. It is connected with the frame of a part of the distributer by means of screws tapped into the said frame and passing through slots $j^3$, (see Fig. 6,) in a plate, $j^4$, which constitutes the body of the said check. As the line of types is pushed forward the foremost type is brought in contact with the end of this check, which controls the advance of the line of types until the thickness of the foremost type shall have been ascertained by the mechanism. There is a stud, $j^5$, (see Figs. 1 and 6,) projecting from one side of the plate $j^4$ of the check, and connected therewith by a screw passing through a slot for the convenience of adjustment, and this stud rests against the face of a lever, $k^4$, by which the motions of the check are controlled. The part $k^1$ of the said lever which acts on the stud $j^5$ of the check is nearly at right angles with the main part of the lever, and its inner face is curved, and its outer face is formed with ratchet-teeth to receive a dog, $o^1$, which may be thrown into any one of the teeth to lock that part of the lever to hold it in place when the check is required to be stopped and held in place. This lever is made in two parts $k^4$ and $k^3$. The lever $k^4$, which controls the check through the part $k^1$, is connected about the middle of its length by a fulcrum-pin, $k^5$, (see Figs. 6 and $6^a$,) with the other part, $k^3$, its inner end turning on a fulcrum-pin, $k^6$, and its outer end receiving motion from a cam, $k^7$, on a shaft, E, which receives motion from any suitable motor.

The said lever is held to the face of the cam by the tension of a spring, $n^1$. The object of making the said lever in two parts, as described, is that the one cam at each revolution of the shaft shall give the range of motion required for the back movement of the check sufficient for the delivery of the thickest type, and so that the part $k^1$ which controls the check may be locked to the position required for the delivery of any thickness of type less than the thickest, while that part $k^3$ of the lever which is acted upon by the cam continues to make its full range of motion.

The time when the checking part of the lever shall be locked is determined by another mechanism.

At the lower end of the channel-way in which the line of types travels, there is an instrument which I term a "hammer," not because it is required to strike heavy blows, but because it strikes a series of rapid but gentle blows against the foremost type in the line, and at right angles to the line of motion of the line of types, to determine when such type can pass by the end of the gage-plate $d$, forming the rear side of the channel-way. This hammer $o^*$ is on the upper end of an arm, $o^4$, of a rock-shaft, $o^5$, (see Fig. 6,) which has another arm, $o^6$, bent at right angles, the end of which is formed with a pintle fitted to a hole in a lever, $q^1$, that is borne down by a spring, $o^7$, onto the periphery of a cam, $p^1$, on the shaft E, which cam is formed, as represented in Fig. 6, to give the required vibratory motions to the hammer; and the arm $o^6$ of the rock-shaft $o^5$ is connected to the lever $q^1$ by another spring, $o^8$, so that when the hammer comes into contact with the type before it has been sufficiently advanced to be moved laterally, the hammer will be stopped, while the cam continues to lift the lever. The cam is so formed as by each revolution to give to the hammer a series of vibrations, each sufficient in range to carry the foremost type a little out of the line of the channel-way in which the line of types is traveling and to carry it partly between the end of the gage-plate $d$ and the check $j^1$, and finally to give it one vibration of sufficient range to transfer the type to the distributer; but as the lever $q^1$, which communicates motion from the cam to the rock-shaft of the hammer, is connected by a spring, so that it can be moved by the cam when the hammer is prevented from moving to an equal extent by the yielding of the springs $o^8$, it follows that at each vibration the hammer is stopped by the type, until it (the type) has been permitted by the check to pass by the end of the gage-plate $d$, and then the hammer, being no longer checked by the type, moves it a little out of line, as before stated, where it is held by the check partly against the end of the channel-way and the next type in the line, and then, if such type be of less thickness than the thickest, the hammer will continue its series of short vibrations until the last and greatest projection on the cam gives it the full range of motion to deliver the type to the distributer.

The motion for locking the part $k^1$ of the check-lever is controlled by the hammer. The check $j^1$ at each operation is permitted to recede a little, to permit the line of types to advance, and this continues so long as the vibrations of the hammer are checked by the type; but so soon as the type can pass by the end of the gage-plate $d$, which depends upon the thickness of the type, and the hammer is permitted to move far enough to carry the type, as before stated, between the check and the end of the gage-plate, the dog $o^1$, before named, is thrown into one of the ratchet-teeth of the rack on the back face of the check-lever, to lock it and hold the check in place, to hold the type in place until the hammer makes the last of its series of vibrations, which last vibration has the required range of motion to deliver the type to the distributer. This locking operation is performed in the following manner: The dog $o^1$ is on the upper end of a lever, $o^9$, the lower end of which turns on a fulcrum-pin, $o^{10}$. To this lever is hinged a rod, $c^4$, which has a shoulder or offset that bears against a stop, $c^5$, (see Fig. 6$^a$,) on the frame, and it is provided with a helical spring, $c^6$, attached to the galley-frame in a diagonal direction, so that its line of tension is oblique, to pull the dog into contact with the rack of teeth on the check-lever, and also to draw the rod $c^4$ toward it, that its shoulder may rest against the stop $c^5$. The position of the rod $c^4$ relatively to the arm of the hammer is such that so long as the vibrations of the hammer are checked by the foremost type the arm of the hammer will not strike the said rod; but as soon as the hammer is permitted to move the type the arm of the rock-shaft which carries the hammer strikes the rod $c^4$ and liberates its shoulder from the stop $c^5$, so that the spring may draw the dog into the rack of the check-lever to lock the check. So soon as the type has been delivered to the distributer the lever $o^9$ is allowed to be drawn down by the spring, returning the check to its original position, and, by means of an inclined plane immediately above the rack on the upper part of the lever, forcing back and latching the lever $o^9$. The number of vibrations to be given to the hammer for each complete operation required for the delivery of a type, relatively to the receding motion of the check, should be such that there shall be at least one vibration while the check recedes a distance equal to the thickness of the thinnest type, and that the range of motion of the check required for the passage of the thickest type shall take place within the series of vibrations of the hammer. I have found a series of twelve vibrations of the hammer sufficient.

The next part of my said invention relates to improvements in that part of the mechanism by which the types are selected and each carried to and deposited in its appropriate place in the channel-way of the case, and the distinction between this part of the mechanism as improved, and my former invention, will be best understood after giving a description of the construction and operation of the machine as at present organized.

The types are all made with one or more notches on one side; and such notch or notches are made at different distances from the end and differently arranged in the several types, so that they shall not be alike in any two types. By reason of this variation any one type can be distinguished from all the others. This has long since been known as a means of distinguishing types. The types are all of the same width, and of different thicknesses, as is well known; and the said notches are formed on one of the faces of what I term the width. This will be understood by any one acquainted with types.

As the types are delivered by the mechanism last above described, they are all delivered with the notched face foremost, and with the lower end resting on a bed-plate, $y^4$. Above this bed-plate there is a rack, F, formed with as many compartments as there are different characters of types to be distributed, with a few extra ones for convenience. And each compartment is formed with parallel sides $r^1$ and of the width of a type to slide in freely but accurately, the front ends of the said racks being slightly beveled that the types may enter freely. And from one side of each rack a pin or pins project, corresponding with the notch or notches in the face of the type which is intended to pass into such rack.

From this it will be seen that no type can pass into any one rack except the one for which it is intended.

After a type has passed into its appropriate rack, it is disposed of as will be hereinafter described.

Now, as each type is delivered, as before stated, to this distributing mechanism, it must be presented for trial in succession to each rack until it comes to the one fitted to receive and permit it to pass. Opposite to the said series of racks there is a series of plungers, $t^1$, (see Figs. 1 and 7,) one such for each rack, and of a suitable form to enter freely. These plungers are all mounted, side by side, in a a frame, $y^5$, (see Fig. 2,) which, for convenience of giving access to the mechanism below it, can be readily attached and detached from the main frame of the machine. Each plunger is fitted to slide longitudinally in suitable ways in the said frame, and forced toward and into its corresponding rack by a helical spring, $d^2$, and they all have a shoulder or pin, $e^2$, on the under side, at the rear end and back of the frame, which rests against a bar, $f^2$, firmly secured to the upper ends of two rocking-bars, $h^2$, (see Figs. 2 and 4,) which, by the tension of the said springs $d^2$, are held against two cams, $y^6$ $y^6$, on the shaft E, by which all the plungers are simultaneously drawn out of the racks and far enough from the front ends of the partitions between the racks to permit the thickest type to pass freely between the faces of the plungers and the ends of the said partitions.

At the time a type is delivered from a line, as before stated, the plungers are advancing, and a slight projection or lip on that side of the first plunger which is nearest to the check is bearing against the type which is being delivered, so that it is delivered by the hammer while it is held up laterally by the end of the gage-plate $d$, and the said projection on the said first plunger, and the impulse which it received from the hammer carries it beyond this slight projection, which is then behind it to prevent it from falling back as the hammer recedes, and it is prevented from falling forward by the outside partition of the first rack; and as it is inclined laterally toward the face of the plunger by reason of the inclination of the machine, it is there held in the required position until the next operation. At this part of the operation the type is back of the forward end of the partitions, and before it can be carried forward and presented to the several racks in succession, until it finds and enters its appropriate one, it must be moved forward of the front end of the partitions. For this purpose there is a series of followers, $s^1$, corresponding to the plungers, but opposite to their faces. They are mounted in a frame, H, adapted to slide on top of the racks $r^1$. They are fitted to slide, each separately, in the said frame, and provided with springs, the tension of which keeps them all in line, but free to yield backward when striking an impediment. The frame H of the followers is attached by its ends to the rear ends of two rods, $u^1$ $u^1$, (see Figs. 1 and 6,) adapted to slide in suitable bearings, and these rods are connected by joint links $y^7$ to two rocking-arms, $a^2$, which are borne by two springs, $y^8$, (see Fig. 1,) against the peripheries of two cams, $w^1$, (Figs. 1 and 6,) on the shaft E, so that by the operation of the said cams the followers are advanced until they come in contact with the types which may be lying against the faces of the plungers; and as the followers can yield by reason of their springs they adapt themselves to any thickness of types which are then carried forward of the front end of the partitions by the forward movement in unison of the frames, the plungers, and of the followers. As the types are so moved they enter slots in two plates, I, termed comb-plates, one above and the other below the plungers $t^1$. The slots in these two plates correspond with the racks, except that they are not so deep. They are both connected by their ends to two frames, J, one at each end, which frames are hinged to the upper ends of two rocking-frames, $y^9$, and the two rods $u^1$ of the frame H of the followers $s^1$ pass through and slide in the frame J of the said combs I.

To return to the type, which has been described as having been delivered to the distributer. When last referred to, it was held between the first plunger $t^1$ and the first follower $s^1$, and, by the motion of these last described, carried into the first slot of the two comb-plates I, and held against the bottom of these two slots by the spring-pressure of the follower. The next thing to be done is to move the two comb plates and the followers laterally, to bring the type opposite to and in line with the first rack, $r$, which is effected by moving the two comb-plates and the frame H of the followers a distance equal to the width of one rack and one of the partitions. This movement is effected by a face-cam, $v^1$, (see Fig. 4,) on the shaft E, which acts on a stud, $t^4$, projecting downward from a plate, $J^4$, attached to the two frames J, which carry the two combs; the said stud being held against the face of the cam by a spring, the tension of which carries the said parts back to their original position when permitted by the form of a cam. In case of any obstruction to the motions in one direction, either by a type out of place or from any other cause, the spring will yield and unclutch the shaft from the driving-pulley, by means to be hereinafter described; and if the obstruction takes place when moving in the opposite direction, the same kind of relief is afforded, by having the said stud $t^4$ connected with the plate $J^4$ by a screw, $l^5$, passing through a slot and connecting the said stud with the said plate by a spring, $l^6$, (see Fig. 2,) so that the combs and followers can stop until the shaft is unclutched. In this way all danger of injury to the types or the mechanism is prevented.

The type having been brought, as above stated, in line with the first rack, is then moved toward the rack, and a short distance into it, by the return movement of the plungers and followers; and if the type is not of the kind intended for that rack, the front face of it not having the notch or notches adapted to the position of the pin or pins in the side of the rack, it is stopped; the plunger yielding by its spring, the series of operations already described take place to shift the said type into the next slot of the comb-plates, which, in the meantime have been returned to their former position with the second slot in line with the first rack, so that the next series of operations shifts the said type in line with and presents it to the second rack, to ascertain if that is its proper place, and so on from rack to rack until it is brought to the proper rack, into which it is carried to a sufficient distance by the plunger, to be delivered in the appropriate channel-way of the case, as will be hereinafter described. At each series of operations one type is delivered to the distributing mechanism to be distributed, so that a series of types is carried at the same time, and each by a mode of operation such as above described.

To stop the mechanism of the distributer in case of any impediment, as above indicated, one of the frames J of the comb-plates I has an arm, $u^2$, the outer end of which is forked and fitted to a wrist-pin, $u^3$, in one arm of a rocker, $t^2$, (see Fig. 4,) which rocker has two arms extending one above and the other below the shaft, and this rocker is alternately rocked in opposite directions by the vibratory motion of the comb-frames. And the outer ends of the rocker-arm are so located that the one or the other of them will be within the plane of motion of the arm of a clutch-dog, $p^2$, pivoted to the shaft. This clutch-dog $p^2$, by the tension of its spring, clutches the driving-pulley $m^1$ (which receives motion from any suitable motor) to the shaft E, from which all the motions of the distributer are derived. And in the rotation of the shaft E, when the clutch-dog approaches the upper arm of the rocker, it will pass freely without unclutching the shaft from the pulley, if the comb-frame has completed its motion in one direction; and so with reference to the other arm of the rocker, if the comb-plate has completed its movement in the opposite direction; but in either case, if the comb-frame has been stopped by any impediment when moving in either direction, the dog will strike one of the arms of the rocker and unclutch the shaft from the driving-pulley, and it will remain unclutched until the impediment shall have been removed and the comb frame permitted to complete its motion, and then the shaft will be clutched and started again.

The next operation to which the types are subjected is to deliver them from the racks into the several channel-ways of the case. For this purpose the bottom plate $y^4$ (see Fig. 2) of the racks is cut out at the back to form channels or passages at the back of the racks for the types to fall through into the corresponding channel-way of the type-case K, which is placed on a sustaining-frame, K'. As before stated, the case may be made all in one; but, for convenience of moving, I prefer to make it in two or more sections.

The back of the passages $s^4$, through which the types fall into the case, is formed by a plate, $l$, (see Fig. 2,) which extends the whole length of the series of racks. It is attached to the upper end of two rods, $s^5$, hinged at their lower ends by two arms, $s^6$, of a rock-shaft, $s^7$, from which it receives an up-and-down movement, and it is held in position against the back edge of the bottom plate of the racks by the tension of the helical springs $s^8$, attached to them and to the arms $s^6$ of the rock-shaft $s^7$. The passages $s^4$ for the types are made of sufficient size for the free passage of the types, except the thickest—that is, so that the thinnest types will not turn—and for the thickest types the said passages are made larger by cutting into the front face of the said back plate $l$. In this way the front faces of the said passages are all in line with each other and with the front end of the channel-ways of the case, into which the distributed types are to be delivered. As a type drops from its rack into the corresponding channel-way it must be pushed back a sufficient distance to receive another. To effect this there is a hole in the front plate $s^9$ of the case leading into each channel-way, and to these holes is fitted a series of pins, $x^4$, projecting from a plate, $m^2$, attached to two rods, $x^5$, that slide in the standards $x^6$ of the frame, and these rods are provided each with a spur, $x^7$, which is borne by a spring, $x^8$, against a cam, $z^6$, (shown in the drawings, see Fig. 2,) on the shaft E to reciprocate the said plate with its pins. The movements are so timed that this plate is moved by the cams $z^6$ (one only shown in the drawings) that its pin $x^4$ may push back the types in the case before the plungers of the distributer carry other types into the racks, that these may fall into the channel-ways of the case. As soon as the types are so pushed back, the plate $l$, back of the passages $i^4$, is let down in front to hold them back as the pins recede, and before the said plate $m^2$ and its pins advance to push back other types the said back plate $l$ must be lifted above the top of the types in the case to permit those last received to pass under its lower edge. In this way the said plate $l$ answers the double purpose of forming the back of the type-passages, and of a guard to hold back the types in the case after they have been pushed out of the way by the plate $m^2$ and its pins. The rock-shaft $s^7$, which operates this back plate $l$, receives motion from a cam, $j^2$, on the shaft E, which cam acts on an arm, $x^9$, that turns freely on the said rock-shaft, but which has a brace, $z^3$, that extends to, and is held against, an arm, $z^4$, of the rock-shaft by a spring, $z^5$, so that, when this loose arm $x^9$ is borne down by the cam, it draws the arm $z^4$ forward by the tension of the said spring, and as the said arm is fast on the rock-shaft $s^7$ the back plate $l$ will be thereby lifted; but if it should meet any impediment, such as a type in a wrong position, the loose arm $x^9$ will yield by its spring-connection to permit the cam to move, while the arm $z^4$, rock-shaft, and back plate $l$ remain still; and when so stopped the upper end of the arm $z^4$ will be in the line of motion of a stop, $z^7$, projecting downward from the comb-carriage, which will be thereby stopped; and, as before stated, the stoppage of this carriage in any part of its range of motion will, by the mechanism before described, unclutch the shaft E from the driving-pulley and stop the mechanism. The loose arm $x^9$ of the rock-shaft $s^7$ is borne against the cam $j^2$ by the tension of the springs $s^8$, before described, which extends from the rod $s^5$ of the back plate to the short arms $s^6$ of the rock-shaft $s^7$, and when the back plate is being drawn down to get in front of the types in the case, if its lower edge should meet an impediment, such as a type out of place, it will be stopped, the said springs yielding slightly, and the other arm of the rock-shaft will be stopped in the line of motion of the stop $z^7$ on the comb-carriage, by which the shaft will be unclutched from the driving-pulley, in like manner as before stated.

If the types are not clean or dry when carried to the back of the racks, they are liable to stick instead of falling into the case below. To loosen them in such event and insure their descent there is a hammer, $L^1$, extending the whole length of the distributer, just over the rear end of the racks. It is faced with wood or other equivalent substance which will not injure the face of the types, and it is attached to two arms, L, of a rock-shaft, $i^2$, the journals of which are fitted to boxes attached to the two rods $u^1$ of the plunger-frame J, and this shaft is provided with another arm, $L^2$, which is acted upon by a spring to depress the said hammer the moment the plungers begin to recede, and by a cam, $L^3$, on the shaft E, to lift it, and control its downward motion.

The first and second followers, $s^1$, above described, instead of being fitted to slide in their frame H, like the others, are each on the end of a spring-lever, H', pivoted to the follower-frame. This variation, however, is merely a matter of convenience in the mode of construction, so as to avoid the necessity of extending one end of the follower-frame too near to the channel-way $d^{10}$, in which the line of types travel to be delivered to the distributer. And as the first of the series of racks $r^1$ can be but a short distance from the line of types to be delivered, and the type-case cannot be conveniently placed near enough to that end of the machine to receive types from the first of the series of racks without crowding the mechanism, I prefer to put stop-pins, which will not permit types to pass into a few of the racks at that end of the machine. And when I make the type-case in two or more parts I put like stop-pins in each of the racks, immediately over each junction of two parts of the case.

It was discovered in practice that the line of types in the channel-ways of the case would assume an inclined position, the upper ends of the types inclining forward toward the front end of the channel-ways, and that with a long line of types so inclined it was very difficult to straighten them, and as the lower end of the forward type is required to be close up to the forward end of each channel-way when the case is transferred to the composing-machine, for reasons to be hereinafter stated, it became important to remedy this defect. The reason why the types assumed this inclined position was that at each operation the forward type of each line was pushed back a little more than the thickness of one type, to leave sufficient space between the front end of the channel-way and the back plate $l$, by which the types are held back, that there might be sufficient space for the next type to drop in freely, and as the case is inclined, the moment the said back plate is lifted the upper ends of the forward types tip forward against the front end of the case, and when pushed by the pins $x^4$ that operation not only moves back the upper end, but the lower end is also moved back a little until they all assume the objectionable inclined position referred to. There is no difficulty in restoring a short line of types to an erect position, but when the line becomes long it is very difficult, if not impossible, to get them in the position required by the composing-machine, because of the surface-friction of the several types, which increases with the force applied to push them into an erect position. I prevent the difficulty above stated by my present invention, which consists in combining with each channel-way of the case, and attached to the side thereof, and at a short distance from the front end, a thin spring, $n^2$, (see Figs. 1 and 2,) the tension of which, pressing against one side of the type near the upper end, and binding them against the other side of the channel-way, prevents the line of types so acted upon by the said spring and those back from tipping forward with those immediately in front; so that only a few of the forward types in each channel-way can assume the said inclined position; and, by pushing against the rear end of each line these are readily brought to an erect position.

The type having been arranged in the channel-ways by the distributer, as described, the case K is transferred to the composing-machine by sliding it upon inclined ways, $A^4$, and there securing it in place by the lower section $A^5$ of the said ways, which springs up in front of the lower end of the case. Each channel-way of the case is provided with a follower, $v^{21}$, which slides freely behind and against each line of types, and these followers are operated to push the lines forward with the foremost type of each line against the front end of the channel-way by mechanism which is the same as in my said patent herein recited, and as represented in the accompanying drawings.

In my former invention the types were lifted from the channel ways of the case to be carried to what may be termed the composing-stick by a series of keys corresponding with the types, the moving of the keys being made to perform all the operations of lifting the types; but by my present invention the operation of lifting the types is performed automatically by the mode of operation of the mechanism which I have invented, the keys being operated by hand, simply to indicate the particular type to be lifted.

There is a series of holes, $g^{30}$, made through the bottom of the case K, one leading to each channel-way and at the front end thereof. And to these holes is fitted a series of lifters, $h^{30}$. They are attached each to, and project upward from, the end of a lever, $j^{30}$. They are springs, by preference made of thin steel, and when the case is removed from the composing-machine they lie in recesses formed in the edge of a plate, $A^6$, and bear, by their elastic force, against the bottom of the said recesses. The lifters are guided into the holes $g^{30}$ by the front end of the case, which projects a short distance below the bottom, and by small beveled flanges $A^7$ between the holes in the bottom of the case.

The levers $j^{30}$, to which the lifters $h^{30}$ are attached, vibrate on a fulcrum-rod, $B^3$, and each of the said levers is made hollow for some distance from the end to which the lifter is attached, to receive a sliding piece, $k^{13}$, which slides therein freely, and which is drawn toward the fulcrum rod $B^3$ by the tension of a spring, $l^5$. Each of these slides $k^{13}$ is formed with a projecting shoulder, so that it can be drawn out to the required distance to be acted upon by the lifting mechanism whenever any given letter is to be lifted. The keys M are arranged in four (more or less) rows of keys, each marked with the character of the type the lifting of which it is to control. They are so arranged in rows that the part to be touched by the operator may be wide enough while the levers of the four, side by side, will correspond with the width of four channel-ways of the case, hence the number of rows may be varied so long as the levers are made to correspond with the case. The key-levers $M^1$ vibrate on a fulcrum-rod, $M^2$, and each has an arm, $m^{18}$, about at right angles and extending up back of the shoulder of the slide $k^{13}$ of the corresponding lever $N^1$. The front ends of the keys are held up by springs $M^3$, and when any one of the keys is depressed its arm pulls the slide $k^{13}$ so that the end thereof shall extend out and over a lifting-bar, $n^{13}$, so that when this is lifted by the mechanism the said lever $j^{30}$ with the lifter $h^{30}$ will be elevated to force up a type out of the corresponding channel-way of the case. The lifting-bar $n^{13}$ is attached to the end of two arms, $o^{13}$ $o^{13}$, of a rock-shaft, $p^{13}$, which rock-shaft has another arm, $r^{13}$, (see Fig. 8,) which is acted upon by a cam, $q^{13}$, on a cam-shaft, L; the said arm $r^{13}$ being borne against the said cam by the tension of a spring, $s^{13}$, so that the lifting operation is performed by the tension of the spring, the cam $q^{13}$ simply controlling the lifting motion and restoring the parts to their original positions. The front end of each of the slides $k^{13}$ is formed with a downward projecting lip, which extends over in front of the lifting-bar, so that it shall not be drawn back by its spring after it leaves the key-lever; and to prevent these parts from becoming disengaged in rapid motion it is locked to the lifting-bar by a pressure-bar, $M^4$, above it, which is attached to the outer ends of two arms, $M^5$, that are pivoted to the arms $o^{13}$ of the lifting-bar. The said pressure-bar $M^4$ and the lifting-bar $n^{13}$ are connected by a spring, $C^4$, (see Fig. 8,) the tension of which holds the slide $k^{13}$ down onto, and with its lip in front of, the lifting-bar $n^{13}$ until toward the end of the descending motion of the lifting bar, when the pressure-bar is stopped by suitable stops on the frame, that the lifting-bar may be permitted to descend sufficiently below the slide $k^{13}$ to permit it to be drawn back by its spring.

The arm $r^{13}$ of the rock-shaft $p^{13}$ is made in two parts, one with a sector mortise, and the other with a wrist and fastening nut, as is well known to machinists.

On the cam-shaft L there is a loose pulley, $f^{13}$, (see Fig. 8a,) which receives a belt from some suitable motor, and the shaft can be clutched to and unclutched from the said pulley by a spring-clutch dog, $C^5$, of similar construction to the clutch, before described, on the shaft E of the distributer. All the operations of lifting, transferring, and depositing a type in the "stick" are performed by one revolution of the said shaft L; and the spring-dog of the clutch is so combined with the keys M that so long as neither one of them is depressed the shaft remains unclutched, and the mechanism remains at rest, but by the mere operation of depressing any one of the keys the shaft is clutched to the driving-pulley and the mechanism started. This is effected by a stop on a lever, $Z^{13}$, which is held in position, with its stop in contact with the arm of the clutch-dog $C^5$, by the tension of a spring, $C^6$, (see Fig. 10,) and hence with the shaft unclutched; and this lever is drawn forward to liberate the clutch-dog by a stud, $y^{13}$, on one of two parallel rods, $u^{13}$, which are adapted near their front ends to slide in suitable holes in the frame, and which at their front ends carry a bar, $t^{13}$, which extends in front of the arms $m^{13}$ of the key-levers, so that when any one of the keys is depressed its arm $m^{13}$ will act against the said bar, and, by the connections described, liberate the clutch-dog, thereby clutching the shaft to the driving-pulley.

The rods $u^{13}$ $u^{13}$ are pivoted at their rear ends to two arms, $w^{13}$ $w^{13}$, of a rock-shaft, $v^{13}$, which is provided with another arm, $x^{13}$, (see Fig. 8,) acted upon by a cam, $e^{13}$, on the shaft L. The form of this cam is such as to restore the stop-lever $z^{13}$, the bar $t^{13}$, and the keys to their original positions in case any of the springs should fail, but mainly to hold the keys, and prevent them from being depressed at any part of the rotation of the shaft, which might be injurious to the mechanism; and, as the keys can only be depressed at the right time by reason of the said cam holding back the bar $t^{13}$ in contact with the front face of the arms $w^{13}$ of the key-levers, it follows that an operator can in a short time so press upon the keys in succession, and thus feel, as it were, the proper time of depressing any one of them, and thereby cause the operations to succeed each other without the necessity of unclutching the shaft at the end of each rotation. The means of stopping are only to be resorted to in case of necessity. When a line of types has run out, it is important to notify the operator and to unclutch the shaft. When this takes place the follower $v^{21}$ in that channel-way of the type case is brought over the hole $g^{30}$ in the bottom of the type-case, so that the corresponding lifter $h^{30}$ cannot enter, and, in consequence, the lifter-bar $n^{13}$ cannot complete its upward motion; and, that the shaft L may then be unclutched to stop the mechanism, one of the levers, $o^{18}$, of the said lifter-bar is connected by a rod, $C^7$, (see Fig. 10,) with a lever, $C^8$, which has a projecting stud that lies in the track of the arm of the clutch-dog $C^5$ as it rotates with the shaft L, and which will unclutch it when it passes, unless the lifter-bar is at that time lifted up, so that if a lifter cannot enter the case to lift a type the shaft is unclutched and stopped, and at the time it is so unclutched by this lever the cam $e^{13}$ is in such a position that the keys cannot be depressed.

Just over the front end of the type-case there is a guard-plate, $i^*$, (see Fig. 8,) so situated that none but the foremost type in each channel-way of the case can be lifted at any one operation, and for this purpose the front edge of this plate is notched to correspond with the different thickness of the types. The under face of this plate is lined with vulcanized india-rubber, or other equivalent material, which will not injure the face of the types.

In my former invention this plate was stationary, and, as the lines of types were advanced, in case of any slight projection of a type, it was liable to catch on the said plate. To avoid this difficulty, my present invention consists in giving a slight up-and-down vibratory motion to the said plate. For this purpose it is attached to two arms, $C^9$, of a rock-shaft, $C^{10}$, provided at one end with another arm, $C^{11}$, which, by a spring, $C^{12}$, is borne against the periphery of a cam, $C^{13}$, on the shaft L, which vibrates the said plate once for every revolution.

The types are lifted between the front edge of the guard-plate $i^*$ and the inner face of the end plate of the channel-ways into the type-passage above, which is formed by the inner face of a fixed plate, $a^{14}$, and a vibrating spring-plate, $b^{14}$, both surfaces forming a passage immediately over the whole length of that part of the type-case from which the types are to be lifted; and, as the types are of different thicknesses, one of the plates must be self-adapting to each and every type which is lifted into this passage. In the machine as described in my said patent of 1857 one of the plates was self-adapting by means of a spring at one end and a joint at the other, and at each operation it was moved sufficiently far from the opposite and fixed plate to admit the thickest type; and as soon as the upper end of the type had entered the passage the plate was liberated, so that by the tension of the spring the type, of whatever thickness, would be griped between the two surfaces during its travel through the passage; but in the said machine the two plates always preserved their parallelism in a vertical direction.

I have improved this part of the machine; and the said improvement consists in giving to the said spring or self-adapting plate, in addition to the motion described in my said patent of 1857, another motion, by which the type, as it is being lifted, is griped by the lower portion of the said plate, and, as it is traveling toward the delivery end of the said passage, it is griped most by the upper portion of the said plate.

The said griping or self-adapting plate $b^{14}$ is attached by one end to an arbor, $D^4$, which has two journals, the one at its extreme outer end fitted to turn in a box, $D^5$, (see Fig. 1,) and at the same time allow the other end of the said arbor to vibrate, and the other journal is near to the connection of the said arbor with the said plate $b^{14}$, and to this journal is fitted a collar, $D^6$, (see Fig. 10,) from which projects a stem fitted to slide in a socket in the upper end of an arm, $D^7$, which vibrates on a fixed stud at $D^8$, and which, by a spring, $D^9$, presses the self-adapting plate $b^{14}$ toward the fixed plate, to gripe the types. The arbor can be connected with the said arm by a universal joint, or any other suitable connection. The said arbor $D^4$, near its outer end, has an arm, $D^{10}$, (see Fig. 1,) with a spring, $D^{11}$, attached, the tension of which tends to hold the pressure-plate against a type with its upper edge making greater pressure than its lower edge while the type is traveling along the passage and the plate is vibrated that its lower edge may make the greatest pressure as a type is being lifted, by a rock-shaft, $L^2$, (see Fig. 10, and dotted lines in Fig. 1,) with two arms, the one $L^3$ being made to act on a pin on the arm $D^{10}$ of the arbor, and the other being pivoted to one end of a shackle-bar, $L^4$, forked at the other end to slide on the shaft L, which guides it while it is acted upon by a cam, $L^5$, on the said shaft L. By this double motion of the self-adapting plate the types are better controlled as they are raised, and as they are carried along the passage, than by the means described in my said patent of 1857.

After a type has been so elevated, and while it is griped in any part of the said passage, it is to be moved along the said passage to the delivery end thereof. This is effected by two instruments denominated shuttles, N. Each shuttle is a plate a little thinner than the thinnest type, that it may slide freely in the passage while such a type is griped between the fixed and the self-adapting plates $a^{14}$ and $b^{14}$, and the upper part is formed with a slide on the upper surface of the fixed plate $a^{14}$. The two shuttles are connected each by an arm, $P^1$, to one of two carriers, $g^{14}$, which carriers are fitted to slide in ways $h^{14}$, one on each side of the type-passage, and the two carriers are reciprocated by a two-throw crank, $P^2$, on a shaft, $i^{14}$, so that they move in opposite directions, one returning as the other is advancing, and as they both move in the same passage when advancing for the return motion they are lifted out of the passage, so that th one that is returning passes over the one tha is advancing. This is effected by having a projecting lip, $q^4$, on each shuttle, which on the return motion passes over into an elevated way, $P^3$, the front of which, $r^{14}$, is curved and hinged, so that in the advance motion the said lip of the shuttle may lift it up to pass by it. In this way the shuttles alternate, one returning while the other is advancing and carrying a type through the passage to the delivery end.

In the machine described in my said patent of 1857, there was but one shuttle, and in consequence all the other operations had to be suspended during its return motion, and by reason of my present improvement I am enabled to deliver double the number of types in the same space of time. The crank-shaft $i^{14}$, which operates the shuttle, receives motion from the cam-shaft L by bevel cog-wheels $l^{14}$, one on the cam-shaft and the other on an intermediate shaft, $k^{14}$, which carries a spur-pinion, $m^{14}$, that drives a spur-wheel, $n^{14}$, of double the diameter on the crank-shaft, which makes but one revolution to two of the cam-shaft. And to prevent breakage in case the shuttles should meet with any impediment, the spur-wheel $n^{14}$ can turn on the crank-shaft, and is connected therewith by a spring-clutch, $q^{14}$, (see Fig. 8,) held in the clutched position by the tension of a helical spring, $p^{14}$, on the crank-shaft, but which can slip to permit the shaft to stop when either shuttle meets with an impediment.

The types are driven by the shuttles, one at a time, beyond the end of the fixed end pressure-plates $a^{14}$ and $b^{14}$ into another passage, O, (see Figs. 1 and 9,) at right angles to the one above described, the bottom O′ of which may be termed the "stick" as it, with one of its sides, takes the place of the stick used by compositors. And the sides of this passage are formed by two parallel plates, $h^{14}$ and $h^{15}$, the space between them being sufficient to receive a line of types. There is a follower, $w^{10}$, adapted to slide freely in this passage, the stock $w^{14}$ of which slides on a fixed guide-rod, $Q^2$, and it carries another rod, $w^{15}$, that slides in suitable guide-holes in the frame, and on this rod there is an arm, $Q^3$, adjustable thereon and secured by a temper-screw, and to this arm a weighted cord, $Q^4$, is secured, which passes over a roller, $Q^5$, which tends constantly to draw the follower toward that end of the passage O into which the types are delivered by the shuttles. In the shuttle-passage there is a spring, $s^{14}$, just over the upper edge of the pressure-plate, the free end of which extends beyond the end of the shuttle-passage, and into the cross-passage, to continue pressure on the type after it is transferred into the cross-passage and move against the follower $w^{10}$, or the types previously delivered. And, so soon as a type has been so delivered into the cross-passage O, it is pushed, and with it the follower $w^{10}$, to the extent of its thickness by a reciprocating plunger, $t^{14}$, that slides in suitable ways in the line of the said cross-passage. The forward end of this plunger is cut out to straddle the spring $s^{14}$, that it may act against the type above and below the said spring. The plunger is moved forward by the tension of a spring, $u^{14}$, (see Fig. 1,) to prevent breakage in case of any impediment to the type, and it is drawn back by a lever, $v^{14}$, the lower end of which is acted upon by a cam, $Q^6$, on the cam-shaft L, the form of the said cam being such as to control the forward movement at the time a type is delivered by a shuttle, and to draw it back out of the way when the next type is delivered by the next shuttle. So soon as a line of types has been completed, and to prevent the operator from overrunning the line, the keys are locked and the shaft L unclutched from the driving-pulley. This is effected by the arm $Q^3$ on the rod $w^{15}$ of the follower $w^{10}$, before described, which is adjusted to the desired length of line of types, and which, on the completion of a line, strikes and moves a stop, $Q^7$, on a rod, $Q^8$, pivoted to one end of a lever, $Q^9$, and the other end of the said lever releases a catch-lever, $Q^{10}$, which is then drawn upward by its spring, $Q^{11}$, and brings a notch, $Q^{12}$, on said catch-lever behind a pin, $Q^{13}$, on one of the rods of the guard-plate $t^{13}$ in front of the key-levers $m^{13}$, thus preventing the keys from being operated, and, at the same time and by the means previously described, unclutches the shaft L from the driving-pulley $f^{13}$, thus stopping all the machinery. In Figs. 1 and 8 these parts are shown.

When the completed line of types has been transferred to the galley, as will be described presently, the follower $w^{10}$ is drawn back by its weight to its original position in the cross-passage, and, at the end of its back movement, the arm $Q^3$ on its rod $w^{15}$ strikes another stop, $Q^{14}$, on the rod $Q^8$, and pulls it back, thereby vibrating the lever $Q^9$, the end of which, acting on an inclined face, $Q^{15}$, on the catch-lever $Q^{10}$, liberates the guard-plate, which is restored, and the mechanism put in condition for another series of operations.

After a line of types has been composed or set by the means above described, the line is to be transferred to the galley P, the bottom of which is on the same plane as the bottom of the passage O, in which the line was composed. For this purpose the plate $h^{14}$, which forms the front side of the said passage, is lifted, so that the line of types can pass under its lower edge. Its ends are attached to two bars of a frame, $Q^{16}$, adapted to slide in ways in the main frame. It is held down by the tension of a spring, $Q^{17}$, (see Fig. 8,) and lifted at the required time by a lever, $d^{15}$, one end of which bears against the lower part of the sliding frame, and the other is acted upon by a cam, $R^4$, (see dotted lines in Fig. 8,) on a shaft, Q, parallel with the shaft L, and which is driven, like the other shaft, by a loose pulley, $R^5$, that receives a band from a line-shaft, and the shaft can be clutched to, or unclutched from, the said pulley by a spring-clutch dog‘ similar to those above described.

Below the said plate $h^{14}$ there is a narrow slot just sufficient to permit a "lead" to pass through it. Below the bed of the galley there is a box, $R^6$, (see Fig. 9,) to contain a series of leads, and provided with a follower, $R^7$, which is made to slide therein by a weighted cord attached to its stem, $R^8$, and passing over a loose pulley, $R^9$, to keep the foremost lead against the back face of the said box, and just under the slot in the bed of the galley. And the frame $Q^{16}$ is provided with two thin plates, $R^{10}$, fitted to slide in slots in the bottom of the box $R^6$, and just under the foremost lead, so that when the said frame is lifted to permit a line of types to be transferred to the galley, a lead is lifted up in front of, and to be transferred to, the galley with the line of types.

The line of types is transferred from the cross-passage to the galley, after the plate $h^{14}$ has been lifted by the plate $h^{15}$, which forms the opposite side of the cross-passage. For this purpose this plate makes part of a frame, $R^{12}$, which vibrates on journals at its lower end, and is held against a stop in the position required while composing a line by the tension of a spring, $R^{13}$, (see Fig. 8,) and to push the line of types onto the galley it is drawn forward against the tension of its spring by a lever, $g^{15}$, (see Fig. 8,) which is acted upon at the required time by a cam, $f^{15}$, on the shaft Q.

When a line is completed, and the mechanism by which it was composed is stopped, as already described, the operator depresses an extra key, $x^{14}$, (see dotted lines in Fig. 8,) which is on an arm, $R^{14}$, of a rock-shaft, $y^{14}$, which has another arm, $R^{15}$, with a stop, $f^{14}$. The said key is held up by the tension of the spring $Q^{17}$, and in that position the stop on the other arm is against the spring-dog of the clutch $a^{15}$ on the shaft Q, which is thereby unclutched, and when the said key is depressed the stop is removed from the dog, the shaft is clutched to the driving-pulley, and the required motions imparted to the mechanism to transfer the line of types to the galley and restore the parts to commence another line; and the key in the meantime having been liberated, the shaft at the end of one revolution is again unclutched and all the parts brought to a state of rest until again started by the depression of the key.

In the machine described in my said patent of 1857 there was no means for preventing a line from being overrun. This was dependent entirely upon the attention and intelligence of the operator, and this part of my present invention consists in the organization of a mechanism by which the operations required for composing a line are stopped automatically so soon as a line is completed.

And in the machine described in my said patent of 1857, the operations required for transferring each line of types to the galley were all derived from a shaft to be turned at the required time by the operator, which was a source of inconvenience; and this part of my present invention consists in controlling the shaft from which the required motions are derived by a key, so that the operator is only required to touch the said key to start or stop the said mechanism by which the said operations are performed.

Having thus described the nature of my said invention, and the mode of construction which I have tried with success, what I claim as my invention, and desire to secure by Letters Patent, is—

1. The combination of the lifting-plate, operated substantially as herein described, for lifting the types to be distributed line by line, the galley on which the types to be distributed are placed, and on which they are advanced toward the lifting-plate, the mechanism, or the equivalent thereof, by which the lifting-plate is operated, and the means, or the equivalent thereof, by which the depressing mechanism is connected with the driving power so soon as a line of types has been delivered to the distributing mechanism, and disconnected so soon as another line is to be lifted, substantially as described.

2. The projecting lip on the face of the lifting-plate to draw down the leads, substantially as set forth, in combination with the sliding plate under the galley, substantially as described, to prevent the leads from dropping out before they are required to be delivered, as set forth.

3. In combination with the projecting lip on the face of the lifting-plate, the employment of a separate plate, which may be applied to or removed from the face of the lifting-plate and under the projecting lip, that the machine may be used for distributing either leaded or solid matter, substantially as described.

4. The means herein described for separating the types of various thickness one by one from the line, and delivering them to be distributed, consisting of the combination of the channel-way in which the line of types is moved, the check against which the foremost type of the line is moved, and which is caused to recede by intermittent motions, each of not greater range than the thickness of the thinnest type, and the reciprocating hammer, or its equivalent, which strikes a series of light blows against the foremost type, to feel when it can pass by the end of the channel-way, and finally moves far enough to deliver the type to the distributer, the said instruments being operated by the mechanisms described, or equivalents therefor, as set forth.

5. The combs having a lateral reciprocating motion, substantially as described, in combination with the series of racks for the reception of the appropriate types, and the spring or self-adapting plungers and followers, which hold the types at each operation while the combs are moved laterally, by means of which the types are shifted at each operation, and each type in turn presented to the several racks until it finds the one into which it can pass, the parts so claimed in combination being operated by the mechanical means herein described, or equivalents thereof.

6. The reciprocating comb-plates, in combination with the clutch on the shaft from which the said motions are derived, the said combination being effected by the intermediate mechanism described, or the equivalent thereof, whereby the shaft is unclutched from the driving-pulley and stopped if, by reason of any impediment, the combs fail to complete their motion in either direction.

7. In combination with the series of racks for receiving the types as distributed, and with apertures at their rear ends for their discharge into the case, the employment of a vibrating or reciprocating hammer to strike the types in case they should have a tendency to stick in the racks, substantially as described.

8. The reciprocating plate back of the apertures in the racks through which the distributed types are delivered in the several compartments or channel-ways of the case, and which descends in front of the types after they have been pushed back to make room for the next types to be delivered, substantially as described, in combination with the clutch on the shaft from which the motions of the said plate are derived, whereby the said shaft will be unclutched from its driving-pulley and stopped in case the said plate meets with any impediment, the said combination being effected by the mechanism hereinabove described, or any equivalent therefor.

9. In the composing part of the machine herein described, the means, substantially as herein described, by which the keys when depressed merely indicate the type which is to be lifted from the case, in combination with the mechanism by which the types are lifted, substantially as described.

10. The lifters for lifting the types from the case, substantially as described, in combination with the clutch on the shaft from which the lifters derive their motions, substantially as described, whereby the said shaft is unclutched from its driving-pulley and stopped whenever any one of the lifters is stopped, so that it cannot complete its upward motion, the said combination being effected by the mechanism herein described, or by equivalent means.

11. Giving a lifting motion to the plate which holds down the types in the case that are back of the foremost type in each channel-way, that they may not be drawn up by the type which is being lifted, substantially as described, the said motion being given to the said plate at the time of and to free the types when they are being advanced, as set forth.

12. So constructing and arranging the self-adapting pressure-plate which constitutes one side of the passage in which the types are received from the case, and in which they are made to slide by the shuttles, that it shall vibrate on its longitudinal axis, substantially as and for the purpose described.

13. The combination of the two reciprocating shuttles with the one channel-way or passage in which the types travel, substantially as described, the said shuttles being alternately lifted in their return motion, that the one which is returning may pass over or by the one which is advancing, as described.

14. The means, substantially as herein described, by which the shaft which drives the composing mechanism is unclutched from its driving-pulley and stopped so soon as a line is completed, that the lines may not be overrun, as set forth.

15. In combination with the shaft which drives the mechanism for transferring each line of type to the galley, the starting-key and clutch, substantially as described, so that the operation of transferring each line is performed automatically, the operator being required simply to operate the said key.

WM. H. HOUSTON

Witnesses:
WM. H. BISHOP,
A. DE LACY.